Oct. 28, 1924. Re. 15,935
L. K. DAVIS
GRIP PULLEY
Original Filed June 12, 1922
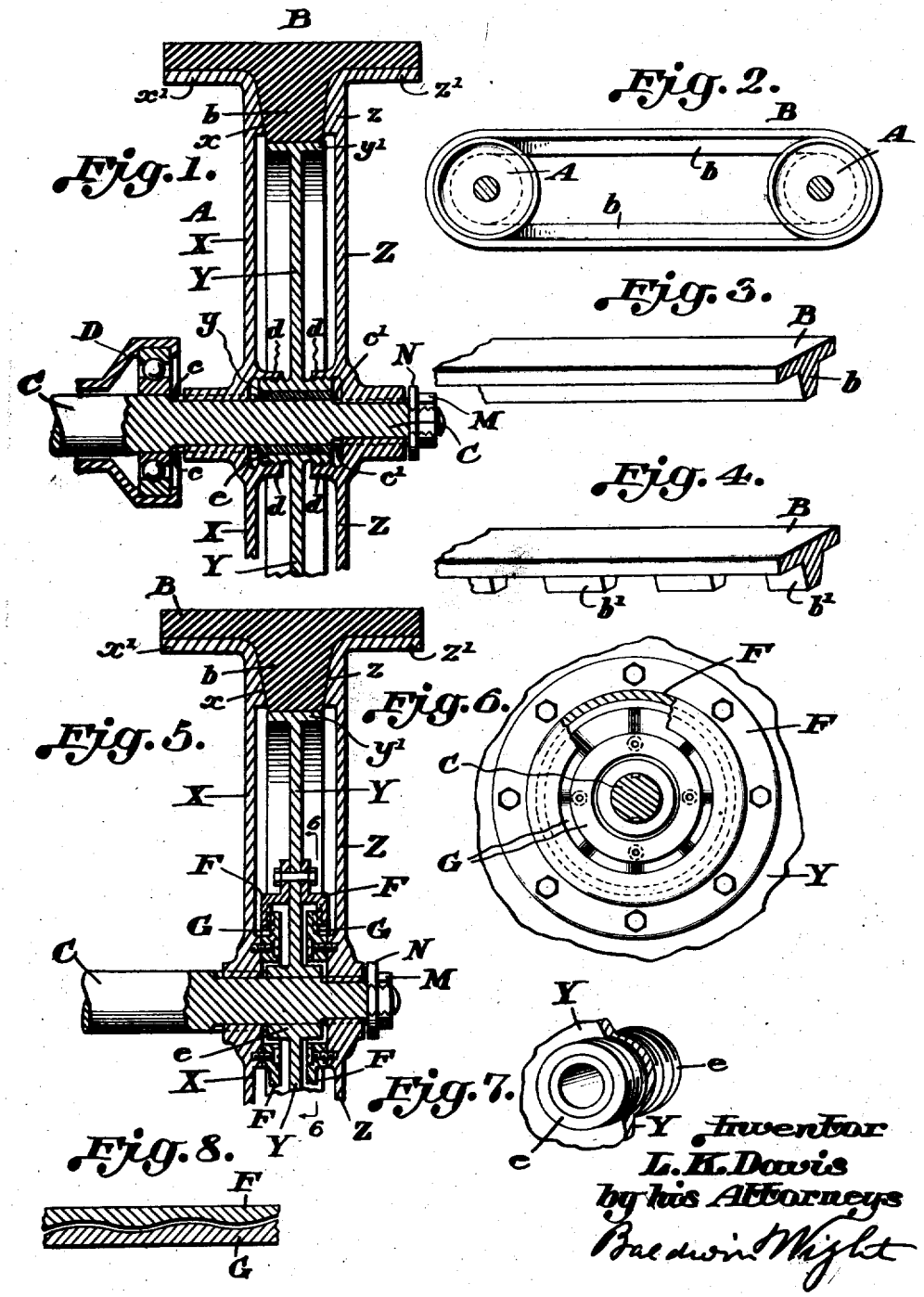

Reissued Oct. 28, 1924. Re. 15,935

UNITED STATES PATENT OFFICE.

LEWIS K. DAVIS, OF WASHINGTON, DISTRICT OF COLUMBIA.

GRIP PULLEY.

Original No. 1,431,376, dated October 10, 1922, Serial No. 567,847, filed June 12, 1922. Application for reissue filed June 18, 1923. Serial No. 646,250.

*To all whom it may concern:*

Be it known that I, LEWIS K. DAVIS, a citizen of the United States, residing in Washington, District of Columbia, have invented certain new and useful Improvements in Grip Pulleys, of which the following is a specification.

This invention relates to sectional belt pulleys of the kind in which provision is made for firmly gripping the belt with which the pulley is associated when there is a tendency for the latter to slip on the former or where the pulley runs ahead of the belt, and the object of the invention is to provide means whereby when the belt starts to slip it will be automatically gripped and carried forward without appreciable lost motion.

Briefly stated, the invention consists in providing means whereby when the belt starts to slip it will cause one of the pulley sections to automatically move toward the other, or the gripping sections or members to be simultaneously moved toward each other in such manner as to cause the gripping members to quickly grasp the belt so that the latter is driven forward without delay.

More specifically, the preferred form of the invention consists in providing three pulley sections, two of which have gripping members engaging the belt and revolving with the axle, and a third or intermediate section which is loose on the axle but is in frictional engagement with the belt and moves coincidentally therewith. The arrangement is such that when the belt starts to slip, the movement of the third or intermediate section is retarded and certain devices connecting the sections are brought into action which immediately cause the belt to be firmly grasped by the gripping members and moved forward in the normal way.

Preferably the pulley, in its most approved form, comprises two gripping sections mounted to turn with a centrally arranged axle and adjustable endwise of the axle and a third section mounted to turn on the axle or about the axis thereof, but having its periphery in engagement with the belt so that it normally moves co-incidentally with the gripping sections. The hubs or bosses of the three sections have threaded connections with each other so constructed that when the belt starts to slip the gripping members are made to grasp the belt in the manner before explained.

In the accompanying drawings:—

Figure 1 is a view in vertical section of parts of a grip pulley embodying my invention.

Figure 2 is a diagram illustrating one of the uses of the invention.

Figure 3 is a perspective view of a portion of a belt which may be employed.

Figure 4 is a view of another form of belt which may be used.

Figure 5 is a sectional view similar to Figure 1 showing a modification.

Figure 6 is a view on an enlarged scale and in section on the line 6—6 of Figure 5.

Figure 7 is a detail perspective view showing the screw threaded connections between the pulley sections in the form of pulley shown in Figure 1.

Figure 8 is a detail view illustrating the cams forming part of the modified construction shown in Figure 5.

The pulley may be employed in various ways and for different purposes. For convenience I have herein shown it as applied to a belt or endless track such as is commonly used in tractors and similar vehicles.

The manner in which the pulley or pulleys A may be associated with an endless belt B is indicated in Figure 2. The belt as shown in Figures 1, 2 and 3 is formed with a centrally arranged rib or flange *b* which is preferably, though not necessarily, tapered. Instead of employing a continuous rib I may use a broken rib or series of teeth *b'* as indicated in Figure 4. The belt is made of flexible material, such as rubber or rubber combined with canvas or other usual materials.

The pulley shown is made in three sections, X, Y and Z. The sections X and Z are keyed to the axle C, while the intermediate section Y is loose on the axle. Preferably the axle C is mounted to revolve in ball bearings D and it is grooved at *c*, *c'* to receive internal ribs on the hubs or bosses of the sections X and Z.

The section Y is placed between the sections X and Z and has a bushing *y* fitted to the axle C so as to turn freely thereon. The sections X and Z are formed at their outer ends or peripheral portions with gripping members *x* and *z* adapted to grasp the rib *b* of the belt and with flanges *x'*, *z'* which make contact with the inner side of the belt B. The periphery $y'$ of the intermediate section Y makes contact with the inner portion of the rib $b$ so that when the belt is moved, the section Y is revolved about the axis of the axle C.

The sections X and Z have inwardly extending annular flanges $d$ which are screw threaded as shown and engage corresponding threads on the hub $e$ of the section Y. Right and left hand threads are employed and the arrangement is such that when the section Y moves relatively to the sections X and Z or when the sections X and Z run ahead of the belt, the gripping sections will be moved towards each other and the rib of the belt will be grasped by the gripping members and thereafter the belt will move forward with the pulley sections in the normal way. This operation is practically instantaneous and there is no appreciable lost motion in the operation of the mechanism.

If in the operation of the pulley the belt starts to slip on the flanges $x'$, $z'$, the intermediate section Y will be retarded in its movement and owing to this relative movement, the screw threaded devices will operate to cause the gripping sections to grasp the belt instantly and cause it to move forward in the normal way with the pulley.

Instead of both sections X and Z being made movable endwise of the axle one only of the sections need be thus moved relatively to the other. In such case only one of the sections need revolve with the axle at all times. The axle C is properly shouldered as indicated to receive the various sections of the pulley and when assembled in the manner shown in Figure 1 they may be held in place by a nut M and washer N or by other suitable devices.

A somewhat similar result may be obtained by the construction illustrated in Figures 5 and 6. Where the parts are similar to those shown in Figure 1 they are similarly lettered. In this case, cam rings F are bolted to the section Y which co-operate with similar cam rings G bolted to the sections X and Z. When the sections X and Z slip under the belt and the section Y is thus retarded, the relative movement will cause the cam rings G to ride on the cams F and the sections X and Z will be drawn toward each other in such manner as to cause the rib $b$ on the belt to be grasped by the gripping members in the manner before described.

I claim as my invention:—

1. A grip pulley adapted to be associated with a belt and comprising a plurality of sections at least one of which is mounted to revolve at all times with a centrally arranged axle and another section mounted to turn about a fixed axis independently of the axle while engaging the belt, and means connecting the sections for causing them to grip the belt when the latter slips on the axle driven section.

2. A grip pulley adapted to be associated with a belt having a rib or flange on its inner side and comprising two sections engaging the inner side of the belt on opposite sides of the rib and at least one of which is adapted to revolve at all times with a centrally arranged axle and a third section mounted to turn independently of the axle while engaging the rib of the belt and means connecting the sections for causing them to grip the belt when the latter slips on the axle driven section.

3. A grip pulley adapted to be associated with a belt and comprising two sections mounted to revolve about the axis of a centrally arranged axle and at least one of which is mounted to revolve at all times with the axle and another section engaging the belt arranged between the others, mounted to turn independently of the axle about a fixed axis while engaging the belt, and means connecting the sections for causing them to grip the belt when the latter starts to slip upon the axle driven section.

4. A grip pulley adapted to be associated with a belt and comprising a plurality of sections, at least one of which is mounted to revolve at all times with a centrally arranged axle, a third section interposed between the others, engaging the belt and which is adapted to turn about the axis of the axle independently of the other sections, and a threaded connection between the several sections for causing the belt to be gripped by the sections when the belt starts to slip on the axle driven section.

5. A grip pulley adapted to be associated with a belt and comprising a plurality of sections, at least one of which is mounted to revolve at all times with a centrally arranged axle and another section mounted to turn independently of the axle while engaging the belt, and a right and left hand threaded connection between the sections operated by the belt for automatically causing them to grip the belt when the latter starts to slip on the axle driven section.

6. A grip pulley associated with a belt and comprising two sections mounted to revolve about the axis of a centrally arranged axle and one of which is movable endwise of the axle toward the other to cause the gripping parts to grasp the belt, another pulley section interposed between the others engaging the belt and mounted to turn on the axle about a fixed axis, and means connecting the several sections for movig the gripping members into firm engagement with the belt.

7. A grip pulley associated with a belt and comprising two sections mounted to revolve about the axis of a centrally arranged axle and one of which is movable endwise of the axle toward the other to cause the gripping members to grasp the belt, another pulley section engaging the belt interposed between the others and mounted to turn on the axle, and a threaded connection between the sections for moving the gripping members into firm engagement with the belt.

8. A grip pulley adapted to be associated with a belt and comprising two sections mounted to revolve about the axis of a centrally arranged axle and one of which is movable endwise of the axle to cause the gripping members to grasp the belt, another pulley section interposed between the others and having a threaded hub engaging a threaded part of at least one of the other sections.

9. A grip pulley adapted to be associated with a belt having a rib or flange on its inner side comprising two sections engaging the inner side of the belt and engaging opposite sides of the rib and at least one of which is adapted to revolve at all times with a centrally arranged axle and a third section mounted to turn independently of the axle about a fixed axis while engaging the belt rib, and means connecting the sections for causing them to grip the belt when the latter slips upon the axle driven section.

10. A grip pulley adapted to be associated with a belt having a rib or flange on its inner side comprising a section which is mounted to turn at all times with the axle, a second section opposing the first and mounted to slide toward and away from the first, a third section engaging the rib on its inner side, and means operated solely by the slipping of the belt to cause the second section to move toward the first to grip the rib of the belt between the two sections.

11. A grip pulley adapted to be associated with a belt having a rib or flange on its inner side comprising a section which is mounted to turn at all times with the axle, a second section opposing the first, a third section engaging the rib on its inner side, and means operated solely by the slipping of the belt to cause a relative movement between the two sections to grip the rib of the belt.

12. A grip pulley adapted to be associated with a belt having a rib or flange on its inner side comprising a section which is mounted to turn at all times with the axle, a second section opposing the first, a third section engaging the rib on its inner side, and means operated by the slipping of the belt to move the second section in a right line towards the other to grip the rib of the belt.

In testimony whereof, I have hereunto subscribed my name.

LEWIS K. DAVIS.